(12) United States Patent
Haigh et al.

(10) Patent No.: US 12,443,778 B2
(45) Date of Patent: Oct. 14, 2025

(54) SYSTEM AND METHOD FOR COMPUTER-ASSISTED DESIGN OF INDUCTOR FOR VOLTAGED-CONTROLLED OSCILLATOR

(71) Applicants: Cameron Goeffrey Watmough Haigh, Fredericton (CA); Zichen Zhang, Edmonton (CA); Negar Hassanpour, Edmonton (CA); Khurram Javed, Edmonton (CA); Jun Luo, Toronto (CA); Yingying Fu, Toronto (CA)

(72) Inventors: Cameron Goeffrey Watmough Haigh, Fredericton (CA); Zichen Zhang, Edmonton (CA); Negar Hassanpour, Edmonton (CA); Khurram Javed, Edmonton (CA); Jun Luo, Toronto (CA); Yingying Fu, Toronto (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1063 days.

(21) Appl. No.: 17/478,458

(22) Filed: Sep. 17, 2021

(65) Prior Publication Data

US 2023/0091004 A1 Mar. 23, 2023

(51) Int. Cl.
*G06F 30/27* (2020.01)
*G06N 3/08* (2023.01)
(Continued)

(52) U.S. Cl.
CPC .............. *G06F 30/27* (2020.01); *G06N 3/08* (2013.01); *G06N 20/00* (2019.01); *H01F 41/04* (2013.01); *G06F 30/373* (2020.01)

(58) Field of Classification Search
CPC ...... G06F 30/27; G06F 30/373; G06F 30/392; G06F 30/20; G06F 30/36; G06F 30/396;
(Continued)

(56) References Cited

U.S. PATENT DOCUMENTS

| 12,169,665 B1 * | 12/2024 | Schubert | G06F 30/10 |
| 2014/0068533 A1 * | 3/2014 | Goswami | G06F 30/3323 716/108 |
| 2020/0090042 A1 | 3/2020 | Wayne et al. | |

FOREIGN PATENT DOCUMENTS

| CN | 108597002 A | 9/2018 |
| CN | 109242099 A | 1/2019 |

(Continued)

OTHER PUBLICATIONS

Choi et al. "Optimal Structure Design of Ferromagnetic Cores in Wireless Power Transfer by Reinforcement Learning" IEEE (Year: 2020).*

(Continued)

*Primary Examiner* — Rehana Perveen
*Assistant Examiner* — Troy A Maust

(57) ABSTRACT

Systems and methods for computer-assisted design of an inductor are described. Target specifications for an inductor are received. An inductor design is generated segment-by-segment using a reinforcement learning agent to generate segment parameters for each added segment. The reinforcement learning agent implements a policy that is learned using a reward computed based on performance of the generated inductor design relative to the target specifications. The generated inductor design is outputted as a candidate inductor design after determining that the generated inductor design satisfies a predefined performance threshold.

20 Claims, 6 Drawing Sheets

(51) Int. Cl.
*G06N 20/00* (2019.01)
*H01F 41/04* (2006.01)
*G06F 30/373* (2020.01)

(58) Field of Classification Search
CPC ... G06F 2111/00–2119/22; G06N 3/08; G06N 20/00; G06N 3/0464; G06N 3/008; G06N 3/092; G06N 3/0895; G06N 3/09; G06N 3/091; G06N 3/094; G06N 3/096; G06N 3/098; G06N 3/0985; G06N 3/04; H01F 41/04; H01F 2021/125
See application file for complete search history.

(56) References Cited

FOREIGN PATENT DOCUMENTS

| | | |
|---|---|---|
| CN | 111553118 A | 8/2020 |
| CN | 111633647 A | 9/2020 |
| CN | 112966405 A | 6/2021 |

OTHER PUBLICATIONS

Guillod et al. "Artificial Neural Network (ANN) Based Fast and Accurate Inductor Modeling and Design" IEEE Open Journal of Power Electronics (Year: 2020).*
Gonzales-Echevarria et al. "Automated Generation of the Optimal Performance Trade-Offs of Integrated Inductors" IEEE Transactions on Computer-Aided Design of Integrated Circuits and Systems, vol. 33, No. 8, Aug. 2014 (Year: 2014).*
Bengio et al. "Flow Network based Generative Models for Non-Iterative Diverse Candidate Generation" v1, Jun. 8, 2021 (Year: 2021).*
A. Atharav and B. Razavi, "11.7 A 56Gb/s 50mW NRZ Receiver in 28nm CMOS," 2021 IEEE International Solid-State Circuits Conference (ISSCC), 2021.
Farhat, Eman Omar, et al. "Optimization of RF on-chip inductors using genetic algorithms." Computational Intelligence in Analog and Mixed-Signal (AMS) and Radio-Frequency (RF) Circuit Design. Springer, Cham 2015.
Fong, Neric HW, et al. "Design of wide-band CMOS VCO for multiband wireless LAN applications." IEEE Journal of Solid-State Circuits 38.8 2003.
Hajami, I. E., Bachir Benhala, and Hamid Bouyghf. "Shape Optimization of Planar Inductors for RF Circuits using a Metaheuristic Technique based on Evolutionary Approach." Advances in Science, Technology and Engineering Systems Journal 5.5 2020.
Hornby, Greg, et al. "Automated Antenna Design with Evolutionary Algorithms," Collection of Technical Papers—Space 2006 Conference. 1. 10.2514/6.2006-7242. 2006.
Liu, Bo, et al. "Synthesis of integrated passive components for high-frequency RF ICs based on evolutionary computation and machine learning techniques." IEEE Transactions on Computer-Aided Design of Integrated Circuits and Systems 30.10 2011.
Torun, Hakki, et al (2018). "A Global Bayesian Optimization Algorithm and Its Application to Integrated System Design." IEEE Transactions on Very Large Scale Integration (VLSI) Systems 26.4 2018.

* cited by examiner

- $L_{err} = L/L_T - 1,\ R_{err} = R/R_T - 1,\ SRF_{err} = 1 - SRF_T/SRF,\ Area_{err} = \dfrac{Area}{Area_{MAX}} - 1$

- $L_{cost} = \begin{cases} |L_{err}| & \text{if } |L_{err}| < 0.05 \\ 2 \times |L_{err}| - 0.05 & \text{if } |L_{err}| \geq 0.05 \end{cases}$

- $R_{cost} = \begin{cases} 0 & \text{if } R_{err} < 0 \text{ and } |L_{err}| \geq 0.05 \\ R_{err} & \text{if } R_{err} < 0 \text{ and } |L_{err}| < 0.05 \\ \min(2 \times R_{err}, 1) & \text{if } R_{err} \geq 0 \end{cases}$

- $SRF_{cost} = \begin{cases} 0 & \text{if } SRF_{err} < 0 \text{ and } |L_{err}| \geq 0.05 \\ \max(SRF_{err}, -1) & \text{if } SRF_{err} < 0 \text{ and } |L_{err}| < 0.05 \\ \min(2 \times SRF_{err}, 1) & \text{if } SRF_{err} \geq 0 \end{cases}$

- $Area_{cost} = \begin{cases} Area_{err} & \text{if } |L_{err}| < 0.05 \\ 0 & \text{if } |L_{err}| \geq 0.05 \end{cases}$

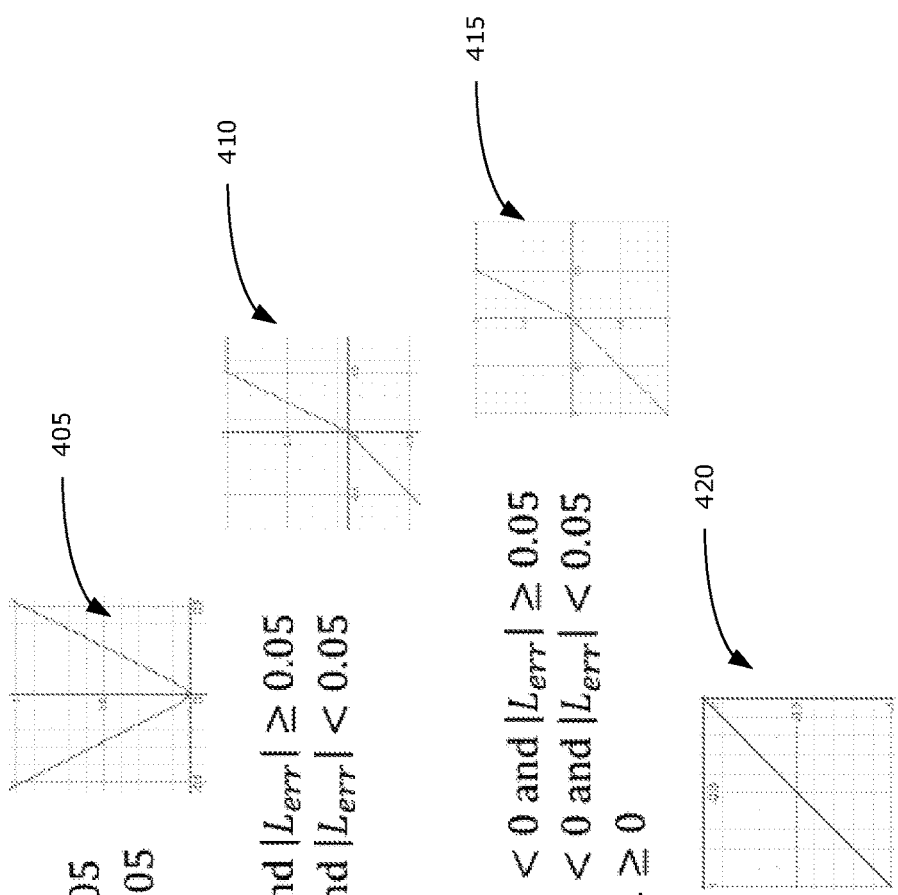

FIG. 4

SYSTEM AND METHOD FOR COMPUTER-ASSISTED DESIGN OF INDUCTOR FOR VOLTAGED-CONTROLLED OSCILLATOR

FIELD

The present disclosure is related to systems and methods for computer-assisted design of an inductor, which may be used in an inductance-capacitance voltage-controlled oscillator, including systems and methods for generation of designs for an on-chip inductor using reinforcement learning.

BACKGROUND

In an inductance-capacitance voltage-controlled oscillator (LC-VCO; or simply VCO), an input voltage is used to control the oscillation frequency of an output signal. VCOs are commonly used in high speed clock generator circuits, for example. Typically, a VCO is designed to achieve certain performance targets, such as a target tuning range, which can be affected by the specifications of the inductor in the VCO (referred to herein as the VCO inductor). Specifications of the VCO inductor include inductance (L), resistance (R), self-resonant frequency (SRF) and quality factor (Q). A design for a VCO inductor (VCO inductor design) is considered to be successful (e.g., can be put into commercial use) if the VCO inductor design exhibits a performance that satisfies predefined target specifications for a VCO inductor (e.g., when evaluated at a testing frequency, inductance must be within 5% of a target inductance; resistance must be below a target resistance; and self-resonant frequency must be above a target frequency) and at the same time satisfies predefined design constraints for a VCO inductor (e.g., within the maximum available area on a chip; makes use of only permitted wire angles, wire spacing; and using a certain metal layer).

Existing approaches for designing a VCO inductor is typically time-consuming, laborious and complex. Existing approaches typically rely on the experience and judgement of a team of engineers, and a successful VCO design may be the result of many rounds of trial-and-error.

Accordingly, it would be useful to provide an electronic design automation tool for designing VCO inductors.

SUMMARY

In various examples, the present disclosure describes systems and methods that provide an electronic design automation (EDA) tool that may be used for computer-assisted or automated design of an inductor that may be used in a VCO. The disclosed systems and methods enable generation of candidate designs of an inductor (candidate inductor designs) in accordance with predefined design constraints for the inductor and target specifications for the inductor, with little or no input from human engineers. In some examples, the disclosed systems and methods also enable new candidate inductor designs to be generated more quickly in response to slight modification of the target specifications.

In examples of the disclosed systems and methods, a candidate inductor design is generated by drawing an inductor design segment-by-segment, where the parameters for drawing each segment are generated using an optimization process. In disclosed examples, a reinforcement learning agent is used to generate the parameters for drawing each segment. Examples of loss computations that may be used to train the reinforcement learning agent are described. In some examples, the reinforcement learning agent may be designed to accept the target specifications of the inductor as input. This may enable more efficient generation of candidate inductor designs in response to changes to the target specifications.

Examples of the present disclosure may provide the technical advantage that faster and more automated generation of candidate inductor designs is possible, which may help to reduce the cost (both in terms of human labor and in terms of usage of resources) and/or time for commercializing a VCO. Examples of the present disclosure may also enable generation of candidate inductor designs that are not influenced by a human engineer's bias or previous experience. Accordingly, unexpected candidate inductor designs may be generated that normally would not be attempted by a human engineer (e.g., due to having unusual geometries).

Examples of the present disclosure may also provide the technique advantage that a large and varied pool of candidate inductor designs may be generated, with lower cost and shorter time requirements, from which a final candidate inductor design may be selected based on other considerations (e.g., placement efficiency of the inductor in a VCO circuit and/or placement efficiency of the VCO circuit in a larger semiconductor device).

In some example aspects, the present disclosure describes a method for generating a candidate inductor design. The method includes: receiving target specifications for an inductor; generating an inductor design segment-by-segment using a reinforcement learning agent to generate segment parameters for each added segment, the reinforcement learning agent implementing a policy learned using a reward computed based on performance of the generated inductor design relative to the target specifications; and outputting the generated inductor design as the candidate inductor design after determining that the generated inductor design satisfies a predefined performance threshold for the inductor.

In an example of the preceding example aspect of the method, generating the inductor design segment-by-segment may include adding each segment by: inputting to the reinforcement learning agent a current inductor state representing any existing segments of the inductor design; obtaining, using the policy implemented by the reinforcement learning agent, segment parameters for a new segment to be added to the inductor design; and adding the new segment to the inductor design, in accordance with the segment parameters.

In an example of the preceding example aspect of the method, the target specifications may be included in the input to the reinforcement learning agent.

In an example of the preceding example aspect of the method, the policy implemented by the reinforcement learning agent may be initially learned using rewards computed based on performance of initially generated inductor designs relative to specifications sampled from initial distributions based on a set of initial reference specifications, and the policy implemented by the reinforcement learning agent may be further learned using the reward computed based on performance of the generated inductor design relative to the target specifications.

In an example of any of the preceding example aspects of the method, the policy implemented by the reinforcement learning agent may be learned by: after a termination condition is met by the generated inductor design, obtaining simulation results representing the performance of the generated inductor design; computing the reward by computing one or more loss components between the simulation results and the target specifications; and updating parameters of a neural network used by the reinforcement learning agent to implement the policy based on the computed reward.

In an example of the preceding example aspect of the method, obtaining the simulation results may include: determining that the generated inductor design is identical to a stored inductor design; and retrieving the simulation results stored in association with the stored inductor design.

In an example of the preceding example aspect of the method, determining that the generated inductor design is identical to the stored inductor design may include: matching a hash key of the generated inductor design with a hash key of the stored inductor design.

In an example of any of the preceding example aspects of the method, determining that the generated inductor design satisfies a predefined performance threshold may include determining that the computed reward satisfies the predefined performance threshold.

In an example of any of the preceding example aspects of the method, outputting the generated inductor design as the candidate inductor design may include: adding the generated inductor design to a set of candidate inductor designs after determining that the generated inductor design satisfies a predefined performance threshold; and outputting the set of candidate inductor designs after a minimum number of candidate inductor designs is satisfied.

In an example of any of the preceding example aspects of the method, design constraints for the inductor may be received, and generating the inductor design may include first initiating a blank design in accordance with the design constraints.

In an example of the preceding example aspect of the method, the reward may be also computed based on the generated inductor design relative to the design constraints.

In some example aspects, the present disclosure describes a computing system including: a memory storing instructions; and one or more processing units coupled to the memory. The processing unit is configured for execution of the instructions to cause the device to: receive target specifications for an inductor; generate an inductor design segment-by-segment using a reinforcement learning agent to generate segment parameters for each added segment, the reinforcement learning agent implements a policy that is learned using a reward computed based on performance of the generated inductor design relative to the target specifications; and output the generated inductor design as the candidate inductor design after determining that the generated inductor design satisfies a predefined performance threshold.

In an example of the preceding example aspect of the computing system, the processing unit may be further configured for execution of the instructions to cause the computing system to generate the inductor design segment-by-segment by adding each segment by: inputting to the reinforcement learning agent a current inductor state representing any existing segments of the inductor design; obtaining, using the policy implemented by from the reinforcement learning agent, segment parameters for a new segment to be added to the inductor design; and adding the new segment to the inductor design, in accordance with the segment parameters.

In an example of the preceding example aspect of the computing system, the target specifications may be included in the input to the reinforcement learning agent, and the policy implemented by the reinforcement learning agent may be initially learned using rewards computed based on performance of initially generated inductor designs relative to specifications sampled from initial distributions based on a set of initial reference specifications. The policy implemented by the reinforcement learning agent may be further learned using the reward computed based on performance of the generated inductor design relative to the target specifications.

In an example of any of the preceding example aspects of the computing system, the policy implemented by the reinforcement learning agent may be learned by: after a termination condition is met by the generated inductor design, obtaining simulation results representing the performance of the generated inductor design; computing the reward by computing one or more loss components between the simulation results and the target specifications; and updating parameters of a neural network used by the reinforcement learning agent to implement the policy based on the computed reward.

In an example of the preceding example aspect of the computing system, the processing unit may be further configured for execution of the instructions to cause the computing system to determine that the generated inductor design satisfies a predefined performance threshold by determining that the computed reward satisfies the predefined performance threshold.

In an example of any of the preceding example aspects of the computing system, the processing unit may be further configured for execution of the instructions to cause the computing system to output the generated inductor design as the candidate inductor design by: adding the generated inductor design to a set of candidate inductor designs after determining that the generated inductor design satisfies a predefined performance threshold; and outputting the set of candidate inductor designs after a minimum number of candidate inductor designs is satisfied.

In an example of any of the preceding example aspects of the computing system, design constraints for the inductor may be received, and the processing unit may be further configured for execution of the instructions to cause the computing system to generate the inductor design by first initiating a blank design in accordance with the design constraints.

In an example of the preceding example aspect of the computing system, the reward may be also computed based on the generated inductor design relative to the design constraints.

In some example aspects, the present disclosure describes a non-transitory computer readable medium having instructions encoded thereon. The instructions, when executed by a processing unit of device computing system, cause the computing system to: receive target specifications for an inductor; generate an inductor design segment-by-segment using a reinforcement learning agent to generate segment parameters for each added segment, the reinforcement learning agent implements a policy that is learned using a reward computed based on performance of the generated inductor design relative to the target specifications; and output the generated inductor design as the candidate inductor design after determining that the generated inductor design satisfies a predefined performance threshold.

In some example aspects, the present disclosure describes a computer program having instructions which, when the program is executed by a computing system, cause the computing system to carry out any of the preceding example aspects of the method.

BRIEF DESCRIPTION OF THE DRAWINGS

Reference will now be made, by way of example, to the accompanying drawings which show example embodiments of the present application, and in which:

FIG. 4 illustrates example computation of a reward that may be used for learning the policy implemented by the reinforcement learning agent of FIG. 3, in accordance with examples of the present disclosure;

Similar reference numerals may have been used in different figures to denote similar components.

DETAILED DESCRIPTION

Figure 1:
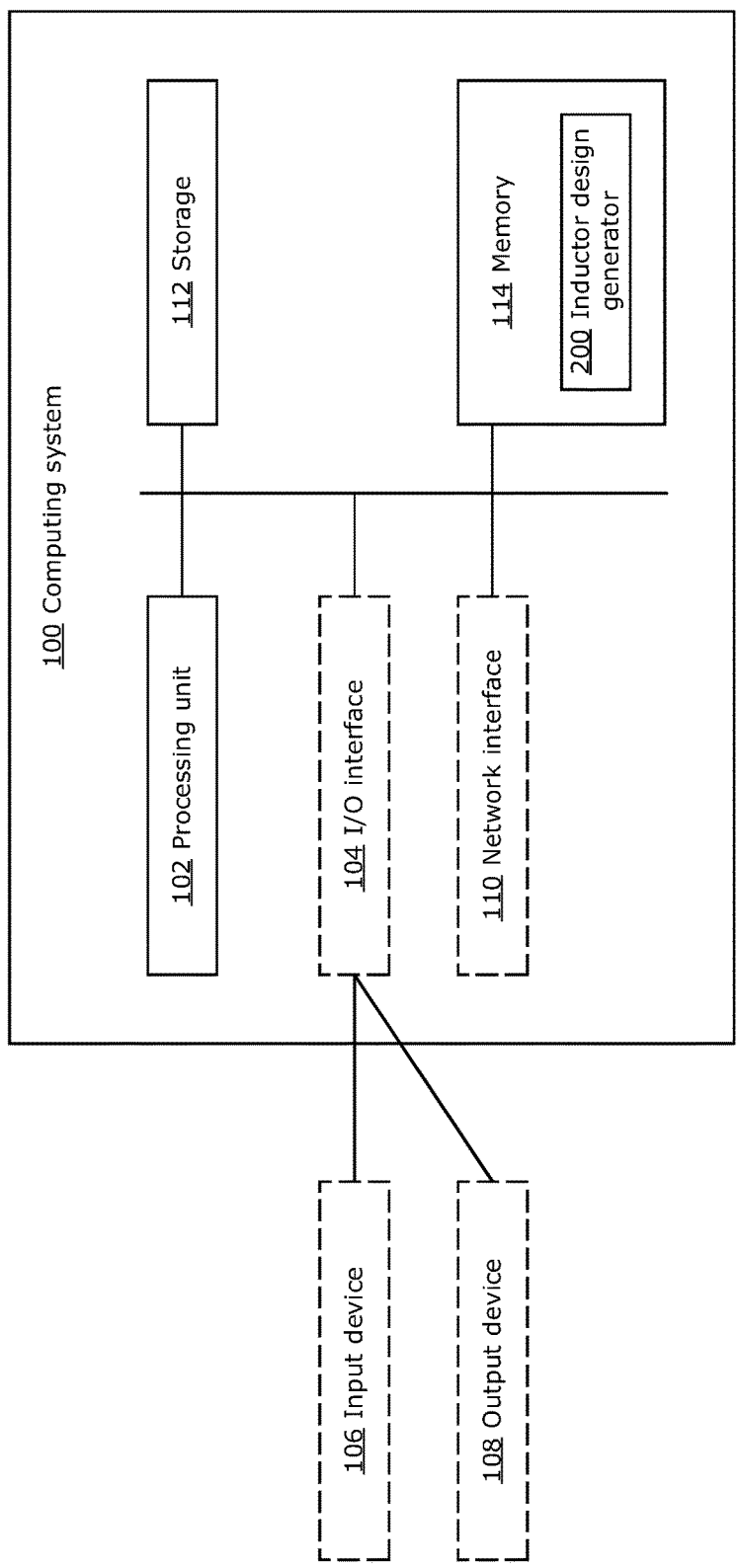
FIG. 1 is a block diagram of an example computing system that may be used to implement examples of the present disclosure.

To assist in understanding the present disclosure, some existing EDA tools for VCO inductor design are discussed. Tools, as described to in the present specification, refer to computer programs or software (or software tools) that include computer-readable instructions that are executable by one or more processing units of a computing system. Such computer programs or tools are often used by developers or engineers to assist in performing a certain task. For example, tools for inductor design may refer to computer programs that are used by engineers to help in circuit design.

Some existing EDA tools for designing an inductor for a VCO start by using a pre-existing inductor design as a template, and optimizing only certain parameters of that template. For example, the general shape (e.g., a spiral) of the inductor may be pre-determined by the template, and the produced candidate inductor designs may only differ by the values of the parameters (e.g., number of turns, wire width, wire spacing, etc.) that are being optimized. Generally, such EDA tools use an optimization procedure (e.g., genetic algorithm, heuristic search or Bayesian optimization) to search through the valid values of the examined parameter, to find parameter values that would result in an inductor design that satisfies the design constraints and meets or exceeds the target specifications.

However, because these existing EDA tools start from a pre-existing inductor design as a template and only optimizes certain parameters of the template, such tools are inherently limited in their ability to generate a wide variety of candidate inductor designs. Further, such existing tools do not provide a way to quickly generate a new inductor design if the target specification is only slightly modified. Finally, such existing tools may rely on a human engineer to select a suitable pre-existing inductor design to use as a template, thus may be more costly and/or time-consuming to implement and may be subject to human bias.

The present disclosure describes example systems and methods that can be used to generate a candidate inductor design for an inductor, which meets predefined design constraints for the inductor and strict performance requirements placed on the target specifications for the inductor, without requiring any template.

For example, the disclosed systems and methods may enable automated generation of a candidate inductor design that has an inductance within 5 percent of a specified target inductance, has a resistance below a target resistance, and has the self-resonant frequency above a target frequency value. Further, the candidate inductor design generated by the disclosed systems and methods should satisfy design constraints for the inductor such as fitting inside a defined area of a VCO allotted for the inductor, with smaller area being preferred.

The disclosed systems and methods may also enable generation of multiple different candidate inductor designs, thus providing a pool of candidate inductor designs from which a final candidate inductor design may be selected to be implemented in a commercial VCO. For example, due to interactions with the VCO circuit as a whole, it may be useful to provide a large and varied pool of candidate inductor designs to provide a designer with the freedom to choose the inductor design that is the best fit for the overall VCO circuit.

An example computing system that may be used to implement examples of the present disclosure is first described.

FIG. 1 is a block diagram illustrating a simplified example implementation of a computing system 100 suitable for implementing embodiments described herein. Examples of the present disclosure may be implemented in other computing systems, which may include components different from those discussed below.

Although FIG. 1 shows a single instance of each component, there may be multiple instances of each component in the computing system 100. Further, although the computing system 100 is illustrated as a single block, the computing system 100 may be a single physical machine or device (e.g., implemented as a single computing device, such as a single workstation, single server, etc.), or may comprise a plurality of physical machines or devices (e.g., implemented as a server cluster). For example, the computing system 100 may represent a group of servers or cloud computing platform providing a virtualized pool of computing resources (e.g., a virtual machine, a virtual server).

The computing system 100 includes at least one processing unit 102, such as a processor, a microprocessor, a digital signal processor, an application-specific integrated circuit (ASIC), a field-programmable gate array (FPGA), a dedicated logic circuitry, a dedicated artificial intelligence processor unit, a graphics processing unit (GPU), a tensor processing unit (TPU), a neural processing unit (NPU), a hardware accelerator, or combinations thereof.

The computing system 100 may include an optional input/output (I/O) interface 104, which may enable interfacing with an optional input device 106 and/or optional output device 108. In the example shown, the optional input device 106 (e.g., a keyboard, a mouse, a microphone, a touchscreen, and/or a keypad) and optional output device 108 (e.g., a display, a speaker and/or a printer) are shown as optional and external to the computing system 100. In other example embodiments, there may not be any input device 106 and output device 108, in which case the I/O interface 104 may not be needed.

The computing system 100 may include an optional network interface 110 for wired or wireless communication with other computing systems (e.g., other computing systems in a network). The network interface 110 may include wired links (e.g., Ethernet cable) and/or wireless links (e.g., one or more antennas) for intra-network and/or inter-network communications.

The computing system 100 may include a storage unit 112, which may include a mass storage unit such as a solid state drive, a hard disk drive, a magnetic disk drive and/or an optical disk drive. The storage unit 112 may store data, for example.

The computing system 100 may include a memory 114, which may include a volatile or non-volatile memory (e.g., a flash memory, a random access memory (RAM), and/or a read-only memory (ROM)). The non-transitory memory 114 may store instructions for execution by the processing unit 102, such as to carry out example embodiments described in the present disclosure. For example, the memory 114 may store instructions for implementing an inductor design generator 200 disclosed herein. The memory 114 may store other software instructions, such as for implementing an operating system and other applications/functions. The memory 114 may also store data, such as design constraints and target specifications for an inductor, a target frequency for inductor design generator 200, and parameters (e.g., parameters of a neural network) for implementing a policy learned by a reinforcement learning agent of the inductor design generator 200 as disclosed herein.

The computing system 100 may additionally or alternatively execute instructions from an external memory (e.g., an external drive in wired or wireless communication with the server) or may be provided executable instructions by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

Figure 2:
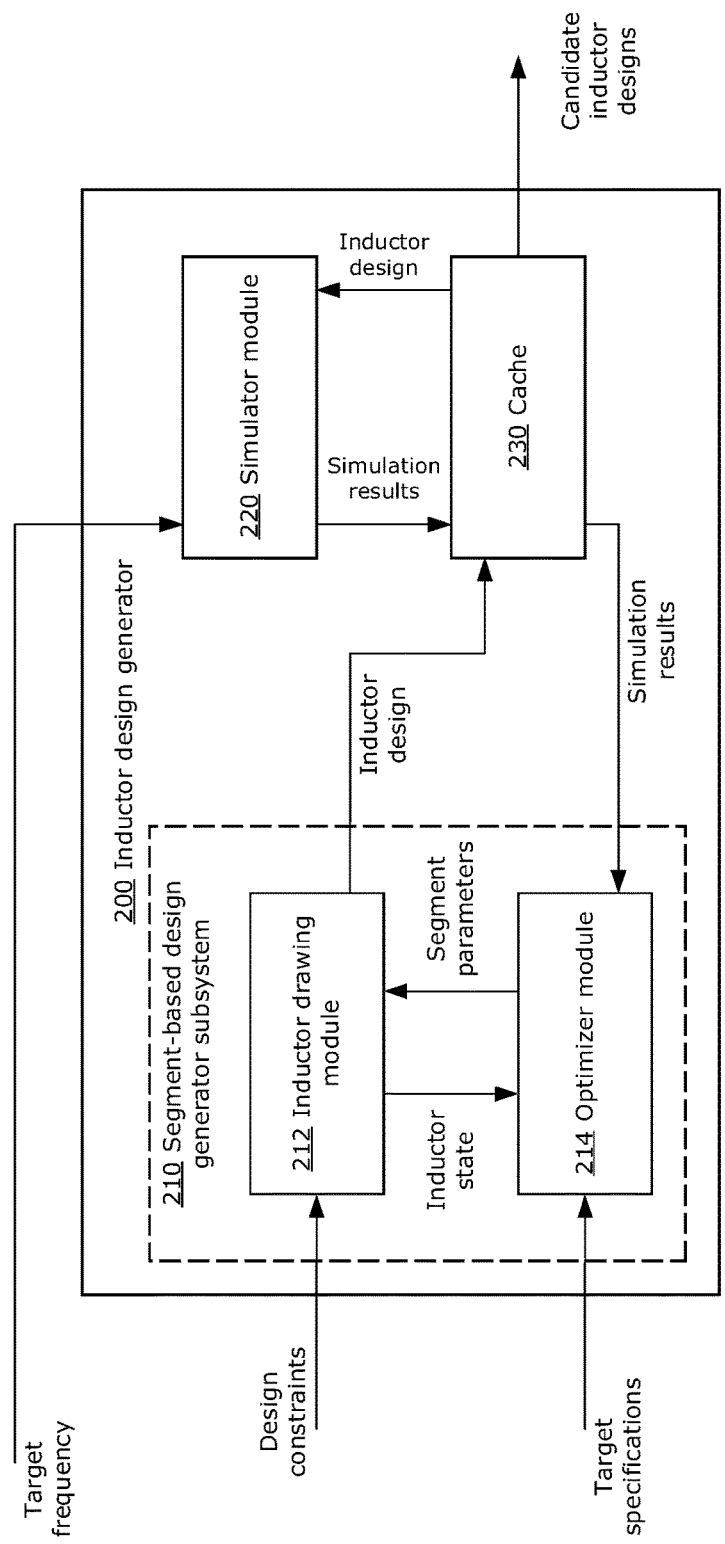
FIG. 2 is a block diagram of an example inductor design generator, in accordance with examples of the present disclosure.

FIG. 2 is a block diagram showing details of an example inductor design generator 200.

The inductor design generator 200 receives as input design constraints and target specifications for an inductor for implementation in a VCO, and outputs one or more candidate inductor designs for the inductor. The inductor design generator 200 also receives a target frequency, which is the operation frequency at which the inductor design must meet the target specifications for an inductor. The inductor design generator 200 generates an inductor design for an inductor by drawing a sequence of line segments, where the parameters for drawing each line segment are optimized (e.g., using reinforcement learning). The top ranked generated inductor designs are outputted as candidate inductor designs. The inductor design generator 200, in the example of FIG. 2, includes a segment-based design generator subsystem 210 (which includes an inductor drawing module 212 and an optimizer module 214), a simulator module 220 and a cache 230.

The inductor drawing module 212 and the optimizer module 214 operate together to generate an inductor design. The inductor drawing module 212 operates to generate an inductor design segment-by-segment (also referred to as "drawing" the inductor design segment-by-segment). The inductor drawing module 212 receives the design constraints (e.g., maximum available area, location of input and output pins, permissible wire angles, permissible wire widths and spacing, type of the metal layer, etc.) inputted to the inductor design generator 200 and initiates a new inductor design in accordance with the design constraints. For example, the inductor drawing module 212 may initiate a blank canvas to store the inductor design as it is being generated segment-by-segment. The inductor drawing module 212 then generates the inductor design by adding line segments, starting from a defined starting location (which may be a location of an input pin defined by the design constraints) and appending each new segment to the end of the previous segment. The parameters for each segment (simply referred to as segment parameters) are generated by the optimizer module 214. The segment parameters may include segment length, wire width, segment angle (relative to the previous segment), metal layer containing the segment, etc.

The inductor drawing module 212 may represent the inductor design, as it is being generated, as a list of points which are connected by segments each having a respective width. Each new segment added to the inductor design is represented by a new entry in the list of points, where the location of the new point in the canvas is computed by starting from the most recent point in the list and traversing the distance defined by the segment angle and segment length (from the segment parameters of the new segment), and assigning the segment width to the new point. In some examples the metal layer may be fixed for generating the inductor design. If there are multiple metal layers available for the inductor, then the segments of the inductor design may be considered to be drawn in parallel across all metal layers and may be connected together (e.g., using vias) so as to minimize resistance.

The inductor drawing module 212, after adding each segment to the inductor design and if the inductor design is incomplete, outputs the current inductor state (i.e., the state of the inductor design including any and all existing segments in the inductor design, while the inductor design is still incomplete) to the optimizer module 214 and receives from the optimizer module 214 the segment parameters for the next segment to add to the inductor design. The inductor drawing module 212 may format the inductor design into a format that can be processed by the other modules 214, 220, 230 of the inductor design generator 200. For example, the inductor drawing module 212 may format the inductor design into an image, such as a Boolean 2D image, to be processed by the optimizer module 214, as discussed further below.

The inductor design is generated segment-by-segment in this manner, until a termination condition or a violation condition is met. A termination condition may be met when the segments have connected to a defined ending location (which may be a location of an output pin defined by the design constraints, or may be any location along a line of symmetry defined between the input and output pins of the inductor). Although it is not necessary for an inductor design to exhibit symmetry, many existing inductor designs are symmetrical along a line of symmetry that is midway between the input and output pins of the inductor and that is perpendicular (or substantially perpendicular) to the edge (of the area defined by the design constraint) where the input and output pins are located. It may be useful for the inductor drawing module 212 to replicate this property of symmetry, both in order to generate inductor designs that may be more acceptable to human engineers and in order to reduce the amount of time and computing resources required to generate a complete inductor design. Using this symmetry, the terminal condition may be satisfied when a segment is added that reaches the line of symmetry (extending from the midpoint between the defined locations of the input and output pins). Then the inductor design may be mirrored across the line of symmetry. A violation condition may be met when a design constraint for the inductor has been violated (e.g., any portion of any segment is outside the maximum available area) or two or more segments overlap or cross, for example.

When an inductor design meets the termination condition without meeting the violation condition, the inductor design may be considered complete and is outputted by the segment-based design generator subsystem 210 (specifically, by the inductor drawing module 212) to be evaluated. For example, the inductor design outputted by the inductor drawing module 212 design may be stored in the cache 230 (or other memory, which may or may not be local to the inductor design generator 200) to be evaluated using simulation results from the simulator module 220. The inductor design may be provided to the cache 230 in the format of a list of points as described above. The list of points may be a format that can be used to generate a hash key for indexing the inductor design stored in the cache 230. The inductor drawing module 212 may also format the inductor design into a file format (e.g., a .spi file format) that can be processed by the simulator module 220.

The optimizer module 214 performs operations to generate segment parameters for drawing a next segment of the inductor design based on the current inductor state, with the goal of optimizing the inductor design to satisfy the target specifications for the inductor. As will be discussed further below, the optimizer module 214 may implement a reinforcement learning (RL) agent. The RL agent implements a learned policy that maps a current state of the inductor design, as the inductor design is being generated segment-by-segment, to segment parameters that are used by the inductor drawing module 212 to add a new segment to the inductor design. The policy is learned by evaluating the performance of the generated inductor design (with respect to how well the generated inductor design satisfies the target specifications for the inductor) using simulation results from the simulator module 220, and feeding back to the RL agent a computed reward (discussed further below) based on the evaluation. The RL agent thus learns over multiple episodes (each episode being the generation of a successfully completed inductor design) the policy to generate segment parameters that result in generated inductor designs that better satisfy the target specifications for the inductor.

The simulator module 220 receives, via the cache 230, an inductor design that has been generated by the segment-based design generator subsystem 210 (specifically the inductor drawing module 212) and simulates the performance of the inductor design at the target frequency. Any suitable simulation software may be used to perform this simulation. The result of the simulation is a set of specifications for the generated inductor design (e.g., inductance (L), resistance (R), self-resonant frequency (SRF) and quality factor (Q)) that can be evaluated against the target specifications for the inductor. The simulator module 220 may receive an inductor design (e.g., in the .spi file format) from the cache 230, for example, or optionally may receive an inductor design directly from the inductor drawing module 212 (not shown in FIG. 2). The simulator module 220 may use any suitable simulation algorithm suitable for simulating passive on-chip components to simulate the performance of the inductor design at the target frequency and generate simulation results for the inductor design. For example, the computer-aided design (CAD) tool ASITIC may be used to implement the simulator module 220.

The cache 230 is a local memory of the inductor design generator 200 which may be used to store and index the inductor designs that have been generated by the segment-based design generator subsystem 210, together with the respective simulation results generated by the simulator module 220. The cache 230 may perform operations to generate an index for each generated inductor design (e.g., using a hash algorithm to generate a hash key for each inductor design). The cache 230 may store a hash map or hash table to index the stored inductor designs. Simulation results for each inductor design may also be stored by the cache 230. Optionally, the cache 230 may also store the result of the evaluation of the performance of each inductor design (e.g., the reward that is computed from the simulation results of each inductor design). If a newly generated inductor design does not yet have any simulation results stored in the cache 230, the inductor drawing module 212 or the cache 230 may pass the inductor design (e.g., in the .spi file format) to the simulator module 220, and may receive the simulation results in return. The simulation result obtained for each generated inductor design may then be stored in the cache 230. Simulation results for each generated inductor design is also sent by the cache 230 to the segment-based design generator subsystem 210 (specifically the optimizer module 214), for learning the policy implemented by the RL agent as discussed further below. Using the cache 230 to store the generated inductor designs locally may enable faster generation of candidate inductor designs by reducing the latency in providing inductor designs to the simulator module 220 and receiving simulation results.

When a stop generation condition is met, the candidate inductor designs (e.g., the generated inductor designs that satisfy a defined performance threshold) are outputted from the cache 230. For example, the stop generation condition may be met when the cache 230 has a sufficient number of candidate inductor designs (e.g., the number of inductor designs that meets a defined performance threshold is at least a defined minimum number) or when the number of stored inductor designs reaches a defined maximum number. The cache 230 may also use the simulation results to rank the candidate inductor designs (e.g., based on evaluation of simulation results for each inductor design, for example by comparing a computed reward for each inductor design). The candidate inductor designs may be sorted according to their respective ranking (e.g., the candidate inductor designs may be ranked according to their respective computed reward, in descending order). The generation of inductor designs may end.

In other examples, a cache 230 may not be used (e.g., the generated inductor designs may be stored outside of the inductor design generator 200), and indexing and ranking of the generated inductor designs may be performed by other modules of the inductor design generator 200.

In general, the modules 212, 214, 220, 230 of the inductor design generator 200 may interact with each other to generate candidate inductor designs until a stop generation condition is met. For example, the stop generation condition may be met when a certain number of candidate inductor designs (e.g., at least a defined minimum number of candidates) has been generated, or when a maximum number of simulations have been performed. For generating each candidate, the inductor drawing module 212 first initializes a blank design (e.g., a new canvas) based on the design constraints (e.g., the maximum available size, the location of the input and output pins, etc.). The inductor drawing module 212 generates an inductor design one segment at a time, where each new segment is added to the existing in-progress inductor design by providing the current inductor state to the optimizer module 214 and obtaining segment parameters from the optimizer module 214 in return. When the inductor design is complete (e.g., meets the termination condition and also does not meet any violation condition) and the inductor design is not already cached, the inductor design is sent to be simulated and then cached. If the inductor design is already in the cache 230 (e.g., the inductor design has an index (e.g., hash value) that is identical to a previously generated inductor design that was previously simulated and cached), the simulation result previously obtained for the inductor design may be retrieved from the cache 230, used to evaluate the inductor design, and to provide feedback to the optimizer module 214. The feedback that is provided to the optimizer module 214 may be in the form of a computed reward, as discussed further below. If the inductor design is not found in the cache 230 (e.g., the inductor design has an index (e.g., hash value) that is not found in the cache 230), then the cache 230 may query the simulator module 220 to obtain simulation results for the inductor design. The simulation results may be stored with the inductor design in the cache 230. The simulation results may also be used to evaluate the inductor design and provide feedback to the optimizer module 214. Based on the evaluation, a determination is made whether the inductor design meets the target specifications (e.g., a determination may be made by considering each target specification individually and/or by comparing a combined evaluation against a defined threshold). If the inductor design meets the target specifications for an inductor, the inductor design may be added to a list (or set) of candidate inductor designs. When the stop generation condition is met (e.g., the number of candidate inductor designs satisfies the defined minimum number of candidates), the set of candidate inductor designs may be outputted.

Figure 3:
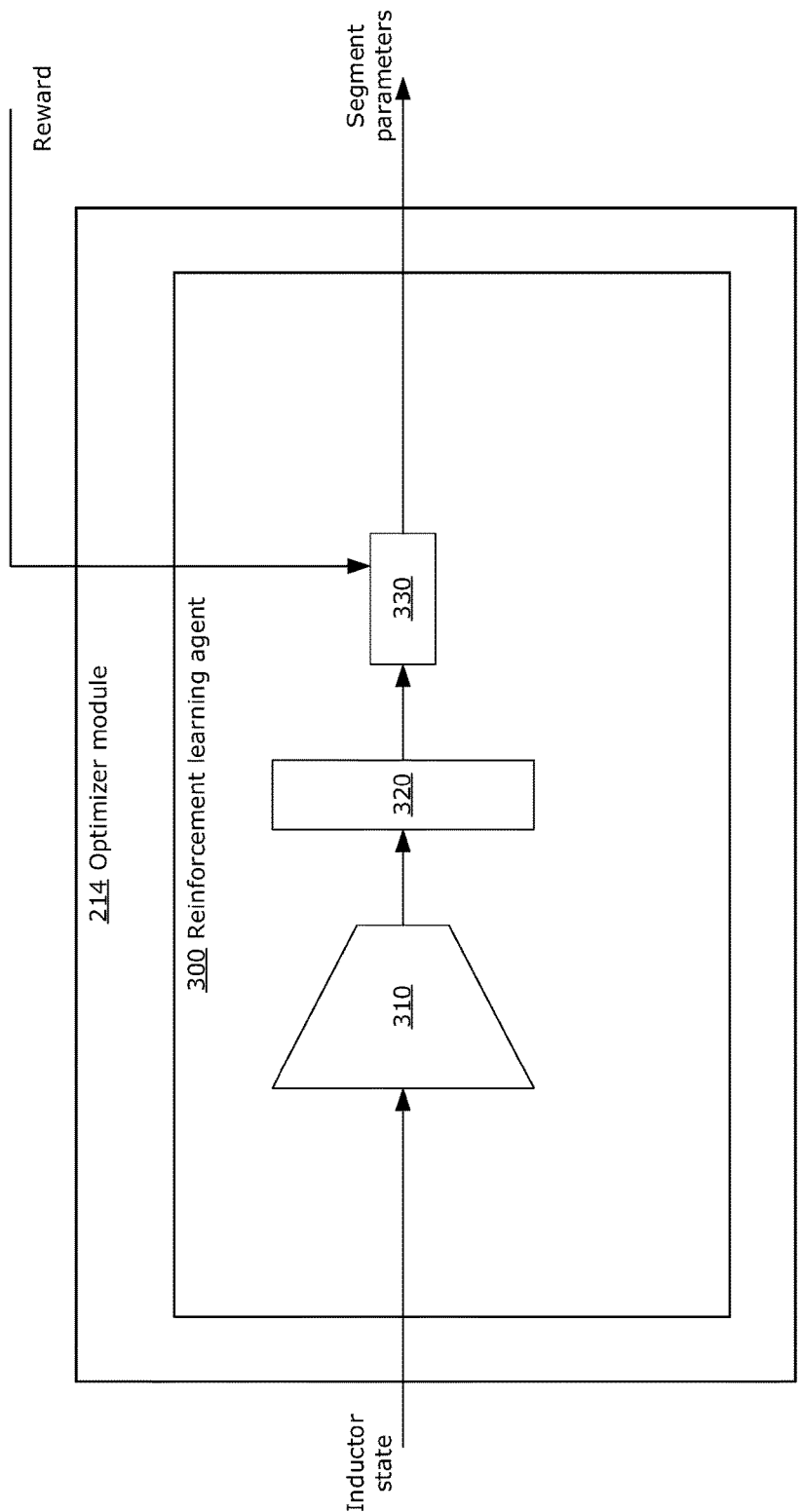
FIG. 3 is a block diagram of an example reinforcement learning agent implemented in an optimizer module that may be used in the inductor design generator of FIG. 2, in accordance with examples of the present disclosure.

The following is an example pseudocode that may help to illustrate how the modules of the inductor design generator 200, as described above, may interact:

while stop generation condition is not met
   inductor drawing module initializes a new canvas based on design constraints
   while (termination condition is not met) and (violation condition is not met)
     get segment parameters from optimizer module based on current inductor state
     add a new segment to the canvas using the new parameters
   endWhile
   if the inductor design meets the design constraints
     if the inductor design is not found in cache
       simulate and cache the inductor design
     endIf
     evaluate the inductor design and provide feedback to optimizer module
     if the inductor design meets the target specifications
       add the inductor design to the list of candidate inductor designs
     endIf
   endIf
endWhile FIG. 3 is a block diagram of an example reinforcement learning agent 300, which may be used to implement the optimizer module 214 in some examples.

FIG. 3 illustrates an example architecture for the reinforcement learning agent 300, however it should be understood that this is not intended to be limiting. In this example, the reinforcement learning agent 300 is a deep Q network (DQN), meaning the reinforcement learning agent 300 includes a deep neural network (i.e., a neural network having multiple hidden layers) together with a Q function.

Generally, the reinforcement learning agent 300 receives as input an observation (i.e., the current inductor state) and, using a learned policy, maps the state to an action in an action space (i.e., generates a set of segment parameters from a space consisting of all possible segment parameter values), which is used by the inductor drawing module 212 to generate the next segment of the inductor design. The segment parameters may include, for example, the width, length and angle of the segment to be added. In some examples, the segment parameters may include other parameters such as the metal layer to be used for the inductor.

The reinforcement learning agent 300 learns, using a reinforcement learning algorithm, a policy which generates segment parameters based on observations (i.e. current states of the inductor design) with the goal of optimizing the inductor design. The reinforcement learning agent 300 undergoes a learning process where the performance of each generated inductor design is evaluated and used to compute loss components. Each loss component is computed with respect to a respective target specification for the inductor, and the sum (or weighted sum) of the negation of the loss components may be used as a computed reward. Over multiple episodes (where each episode involves generating a complete inductor design), the reinforcement learning agent 300 learns to improve the implemented policy so as to maximize the computed reward, such that the generated segment parameters result in generated inductor designs that better satisfy the target specifications for the inductor.

The policy may be implemented by the reinforcement learning agent 300 using a Q function, where the policy is the argmax of the output of the Q function. In this example, a Q network 330 is used to implement the policy, where the Q network 330 is an approximation of the Q function (i.e., the policy that is implemented by the reinforcement learning agent 300 may be an approximation of a theoretical optimal policy). The computed reward may be used as an input to a loss function that is used to update the parameters of the Q network 330 in order to generate segment parameters that optimize the inductor design. Learning the policy thus involves updating the parameters (e.g., weight values) of the Q network 330 with the goal of maximizing the reward.

In some examples, some segment parameters (e.g., parameters other than segment angle) may be fixed, which may enable faster learning of the policy implemented by the reinforcement learning agent 300.

As shown in FIG. 3, the reinforcement learning agent 300 receives the current inductor state from the inductor drawing module 212. The current inductor state may be represented as a Boolean 2D image that matches the size of the maximum available area (e.g., the size of the drawing canvas used at the inductor drawing module 212), scaled to pixels by a predefined scaling factor (e.g., 1 pixel per µm). For each pixel in the Boolean 2D image, the pixel value is set to true (or a value of "1") if the inductor is drawn over that pixel, and set to false (or a value of "0") otherwise. The current inductor state may be referred to as an observation that the reinforcement learning agent 300 processes.

The observation (i.e., the current inductor state) is inputted to an image encoder 310, which may include, for example, one or more convolutional layers that encode the observation (i.e. 2D Boolean image representing the current inductor state) into an encoded representation. The encoded representation is further inputted to one or more hidden layers 320 (which may include one or more convolutional layers and/or one or more fully connected layers, for example), which may process the encoded representation into a feature representation representing certain features of the observation (i.e. the current inductor state). The feature representation is processed by the Q network 330 (which is a network layer that implements the policy of the reinforcement learning agent 300, by approximating a Q function), which outputs a set of segment parameters.

The use of the reinforcement learning agent 300 to implement the optimizer module 214 enables the segment-based design generator subsystem 210 to generate inductor designs, based on a given set of target specifications for an inductor, in an autonomous manner. Using the reward as disclosed herein, the segment-based design generator subsystem 210 is able to generate inductor designs that (as training progresses) aim to meet (and possibly exceed) the target specifications for the inductor. The stochasticity of the learning process for the reinforcement learning agent 300 means that the set of candidate inductor designs that are outputted by the inductor design generator 200 are not limited by human experience or human expectations, and may include various different inductor designs which meet the target specifications. The human engineer may then select a desired inductor design from the different candidate inductor designs to fit into a particular VCO circuit.

The present disclosure describes an example of a reward that may be used by the reinforcement learning agent 300 to learn a policy that maps a current inductor state to segment parameters, where the goal of the learned policy is to optimize the inductor design, given a set of target specifications for the inductor. As discussed below, the reward may also be computed based on a design constraint such as a maximum area. The reward may be a terminal reward, meaning that the reward is fed back to the reinforcement learning agent 300 only at the end of an episode (i.e., after an inductor design has been completed successfully). Feedback for incomplete inductors may be defined as a reward of zero. Further, the reward may be defined such that if an inductor design is not successfully completed (e.g., the generation of the inductor design by the inductor drawing module 212 was ended due to a violation condition being met) a small penalty (i.e., a negative reward) is fed back to the reinforcement learning agent 300.

If the inductor design is successfully completed (e.g., the termination condition is met and no violation condition is met), then a reward is computed based on simulation results. As previously mentioned, each generated inductor design is stored in the cache 230 and the simulation results (from the simulator module 220) for the generated inductor design for each generated inductor design is also stored in the cache 230 (unless an identical inductor design already exists in the cache 230, in which case the corresponding simulation results may be simply retrieved from the cache 230 as described above). The simulation results are used to compute a reward that evaluates how well the inductor design meets the target specifications. In an example, the reward is computed from loss components that evaluate performance of the inductor design with respect to target specifications for the inductor including target inductance, target resistance and target self-resonant frequency. In some examples, the area occupied by the inductor design may be used for a loss component that optionally used to compute the reward. The maximum area that is available for the inductor design (e.g., the maximum available area for the inductor in a VCO circuit) is a design constraint for the inductor, in that any inductor design that extends outside of the maximum available area would be found to meet a violation condition and is not considered to be a successfully completed design. The area that is occupied by the inductor design (i.e., the area bounded by the segments of the inductor design) is an optional optimization target in that it may be preferable for the inductor design to occupy a smaller area.

FIG. 4 illustrates an example of how loss components, which may be used to compute the reward, may be computed. In this example, the reward is computed using a sum of the negation of four loss components, namely an inductance loss, a resistance loss, a self-resonant frequency loss, and an optional area loss.

The inductance loss $L_{cost}$ is defined to increase as the error (represented by $L_{err}$) between the simulated inductance L and the target inductance $L_T$ increases. The design of the inductance loss $L_{cost}$ is illustrated by the $L_{cost}$ vs. $L_{err}$ graph 405. In this example, the inductance loss $L_{cost}$ is designed to increase faster (i.e., the slope of $L_{cost}$ vs. $L_{err}$ graph 405 is larger) if the absolute value of $L_{err}$ is outside a defined 5% margin (which may be manually tunable). The reward may be designed such that, if $L_{err}$ is outside the defined 5% margin then the other loss components are only considered if the other loss components have a positive value.

The resistance loss $R_{cost}$ is defined based on the error (represented by $R_{err}$) between the simulated resistance R and the target resistance $R_T$. The design of the resistance loss $R_{cost}$ is illustrated by the $R_{cost}$ vs. $R_{err}$ graph 410. The resistance loss $R_{cost}$ is defined to be 0 when the simulated resistance R is equal to the target resistance $R_T$; is lower when the simulated resistance R is under the target resistance $R_T$; and is larger for when the simulated resistance R is above the target resistance $R_T$, and capped at 1 so that the resistance loss $R_{cost}$ does not overpower the other loss components.

The self-resonant frequency (SRF) loss $SRF_{cost}$ is defined based on the error (represented by $SRF_{err}$) between the simulated SRF value SRF and the target SRF value $SRF_T$. The SRF loss $SRF_{cost}$ is defined similar to the resistance loss $R_{cost}$, and is illustrated by the $SRF_{cost}$ vs. $SRF_{err}$ graph 415. Compared to the resistance loss $R_{cost}$, the SRF loss $SRF_{cost}$ is lower for simulated SRF value SRF above the target SRF value $SRF_T$ and is larger for simulated SRF value SRF below the target SRF value $SRF_T$.

The area loss $Area_{cost}$ is defined based on the error (represented by $Area_{err}$) between the area Area occupied by the inductor design (i.e., the area bounded by the segments of the inductor design) and the maximum available area $Area_{MAX}$ (e.g., the maximum available area for the inductor within the VCO circuit). The design of the area loss $Area_{cost}$ is illustrated by the $Area_{cost}$ vs. $Area_{err}$ graph 420. The area loss $Area_{cost}$ is 0 if the maximum available area $Area_{MAX}$ is entirely used up and decreases as less area is used. As previously mentioned, the area loss may be optional, and may not be computed.

For each inductor design that is successfully completed, the reward is computed using the loss components as described above and fed back to the reinforcement learning agent 300. The reinforcement learning agent 300 updates the parameters of its policy (e.g., updates the weight values of the Q network 330 using the reward as an input to a loss function) with the goal of minimizing the loss components of the reward, so that more optimal inductor designs are generated by the reinforcement learning agent 300 (where more optimal inductor designs are those that meet and exceed the target specifications, and optionally occupy smaller area).

The computed reward for each generated inductor design may, in some examples, also be stored in the cache 230. The computed reward for a given inductor design may be used to determine whether the given inductor design should be included in the set of candidate inductor designs, for example by determining whether the computed reward satisfies a defined threshold.

Figure 5:
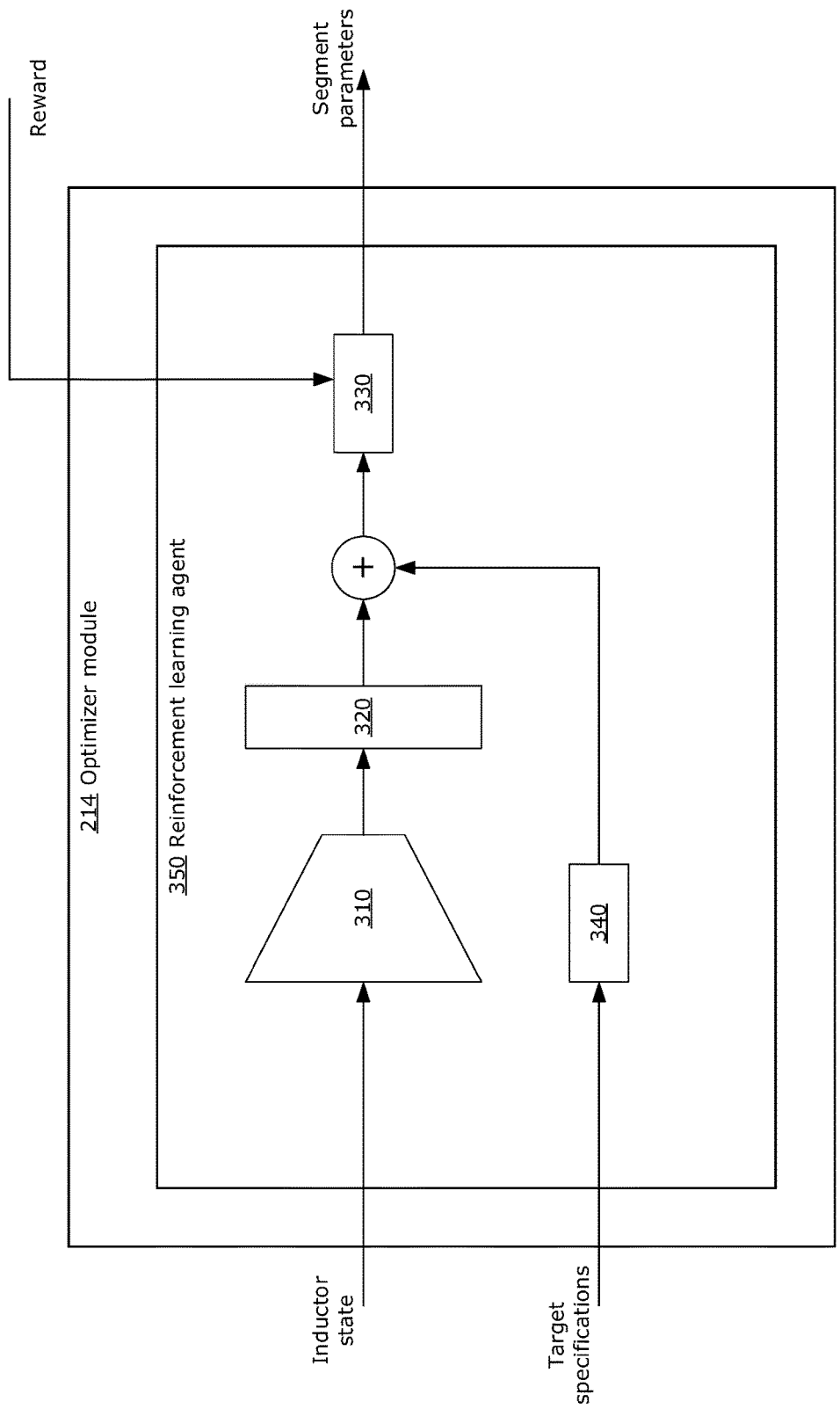
FIG. 5 is a block diagram of another example reinforcement learning agent implemented in an optimizer module that may be used in the inductor design generator of FIG. 2, in accordance with examples of the present disclosure.

FIG. 5 is a block diagram of another example reinforcement learning agent 350, which may be used to implement the optimizer module 214 in some examples.

The architecture of the reinforcement learning agent 350 is similar to that of the reinforcement learning agent 300 of FIG. 3, including the image encoder 310, one or more hidden layers 320 and the Q network 330. Additionally, the reinforcement learning agent 350 of FIG. 5 includes a normalization layer 340 that enables the target specifications for an inductor to be received as an additional input to the reinforcement learning agent 350. The target specifications for an inductor are normalized by the normalization layer 340, and the normalized specifications are combined (e.g., concatenated) with the feature representation and processed by the Q network 330.

By enabling the target specifications for an inductor to be received as an additional input to the reinforcement learning agent 350, the reinforcement learning agent 350 may more quickly learn a policy to generate segment parameters that optimize the inductor design, when the target specifications for an inductor (e.g., the target inductance, target resistance and target SRF) are changed. This may be considered a type of transfer learning by the reinforcement learning agent 350.

To enable this transfer learning, the training of the reinforcement learning agent 350 may the reinforcement learning agent 350 initially learning the implemented policy using rewards computed based on the performance of initially generated inductor designs, where the initially generated inductor designs are evaluated based on their performance relative to specifications sampled from initial distributions based on initial reference specifications. The initial distributions are probabilistic distributions for each specification for an inductor, which may be defined as a normal distribution or uniform distribution centered on the initial reference specifications for an inductor and having maximum and minimum values relative to the initial reference specifications. The initial distributions may be defined based on the assumption that modifications to the initial reference specifications will be within a defined range (e.g., within 20%) of the initial reference specifications. For example, the initial distribution may be a normal distribution that covers a range between 20% above and 20% below each initial reference specification. For example, for a given initial reference inductance $L_T$, the initial distribution may be a uniform distribution in the range $[0.8L_T, 1.2L_T]$; similar initial distributions may be defined for other initial reference specifications (including initial reference resistance, initial reference SRF, and initial reference maximum area). During the initial learning of the policy implemented by the reinforcement learning agent 350, instead of learning the policy to achieve a fixed target specifications for an inductor (e.g., a fixed target inductance, fixed target resistance, fixed target SRF and fixed maximum area), the reinforcement learning agent 350 learns the implemented policy by, in each episode (where an episode corresponds to generating one complete inductor design), sampling a set of specifications from the initial distributions (i.e., the specifications used for each episode is a single set of specifications sampled from the initial distributions). In this way, the reinforcement learning agent 350 initially learns a policy to generate segment parameters based on the goal of achieving any target specifications that fall within the initial distributions.

After this initial learning is complete (e.g., after a minimum number of inductor designs that satisfy a predefined performance threshold have been generated, or after a minimum number of unique inductor designs have been generated), any target specifications for an inductor that fall within the initial distributions may be provided as input to the reinforcement learning agent 350. The reinforcement learning agent 350 may then further learn (i.e., fine-tune) the implemented policy using rewards computed based on performance of generated inductor designs relative to the target specifications, in order to generate segment parameters that result in an inductor design that is optimized to the inputted target specifications.

Because the specifications for an inductor (both sampled specifications during initial training, and target specifications) may have different ranges and units (e.g., the target resistance may have a magnitude and unit that is not readily comparable to the target inductance), the reinforcement learning agent 350 may process the specifications using the normalization layer 340. The normalization layer 340 serves to normalize each specification, for example by mapping values in the initial distributions to a defined range such as the range [0, 1]. For example, the initial distribution $[0.8L_T, 1.2L_T]$ may be mapped to the range [0, 1] such that a target inductance that falls within the range $[0.8L_T, 1.2L_T]$ is normalized to some corresponding normalized inductance within the range [0, 1]. Each specification may be similarly normalized by the normalization layer 340. The normalized specifications may then be combined (e.g., concatenated) with the feature representation generated by the hidden layer(s) 320 and processed by the Q network 330. The reward that is used to learn the policy implemented by the reinforcement learning agent 350 may be similar to that discussed above (e.g., having loss components based on performance relative to target specifications, and optionally based on occupied area).

Although the reinforcement learning agent 350 of FIG. 5 may require extra learning episodes to initially learn a policy based on the initial distributions, compared to the reinforcement learning agent 300 of FIG. 3 the reinforcement learning agent 350 of FIG. 5 may more quickly update the policy so as to generate inductor designs that satisfy the target specifications when the target specifications are slightly modified (e.g., during the fine-tuning phase of the design process for the VCO circuit).

In some examples, the inductor designs that are generated by the segment-based design generation subsystem 210 may assume that the segments of the inductor are drawn in parallel across multiple metal layers, with connections (e.g., vias) between metal layers. In such examples, the segment parameters generated by the reinforcement learning agent 300, 350 do not include the metal layer and the action space (i.e., space of all possible segment parameter values) from which the reinforcement learning agent 300, 350 generates the segment parameters does not include metal layers as a possible parameter.

In other examples, the metal layer(s) for each segment may be a parameter included in the segment parameters. For example, the segment parameters may include segment width, segment length, segment angle and also segment layer. The design constraints for an inductor may specify the metal layers that can be used for the inductor design. For example, if layer 1 and layer 2 are available to be used for the inductor design, the segment parameters may indicate whether a segment should be drawn on layer 1, layer 2 or both layer 1 and layer 2. Connections (e.g., vias) may be used to connect between segments drawn on different metal layers. Operation at the reinforcement learning agent 300, 350 may be as described above, however the action space (i.e., space of all possible segment parameter values) from which the reinforcement learning agent 300, 350 generates the segment parameters is extended to include metal layers as a possible parameter.

At the inductor drawing module 212, the inductor design may be formatted in a manner that supports the use of different metal layers for different segments. For example, the formatting of the inductor design to a file format that can be processed by the simulator module 220 may be adapted (e.g., through hand engineered metrics or some other heuristic) to properly represent the connections between different metal layers. The formatting of the current inductor state to a Boolean image that can be processed by the reinforcement learning agent 300, 350 may also be adapted by adding channels to the Boolean image, each channel corresponding to a respective metal layer.

Enabling the inclusion of metal layer as a segment parameter may enable the inductor design generator 200 to generate more complex candidate inductor designs that span different metal layers, increasing the variation in the candidate inductor designs. This may provide a human designer with a greater variety of candidate inductor designs from which to select one inductor design to better suit the VCO circuit, for example.

Figure 6:
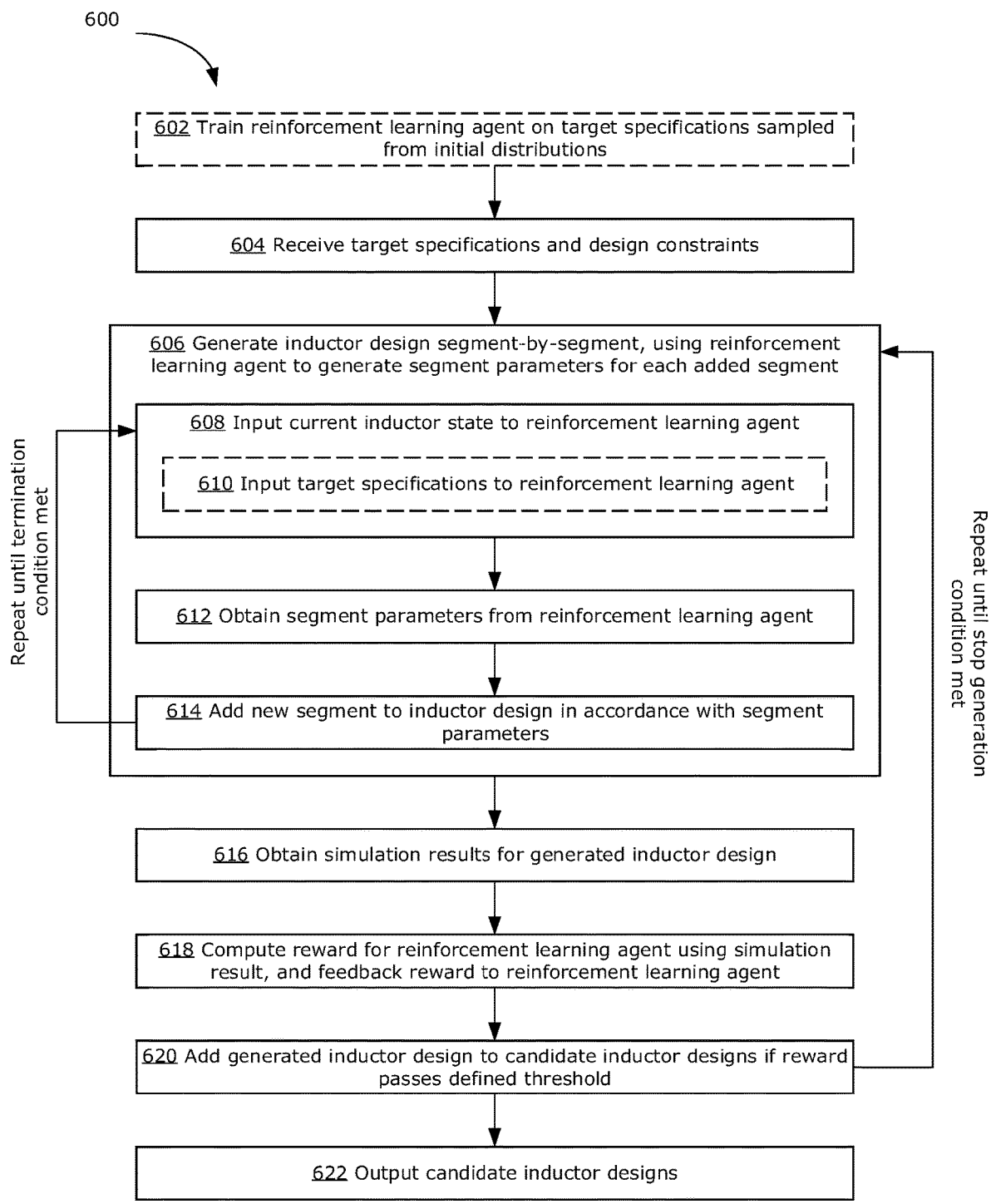
FIG. 6 is a flowchart of an example method for generating candidate inductor designs, in accordance with examples of the present disclosure.

FIG. 6 is a flowchart of an example method 600 for generating candidate inductor designs, for example using the inductor design generator 200. In particular, the method 600 uses a reinforcement learning agent to implement the optimizer module 214, such as the reinforcement learning agent 300, 350 disclosed herein, for generating segment parameters. The example method 600 may be performed by the computing system 100, for example (e.g., by the processing unit 102 executing instructions stored in the memory 114).

Optionally, at 602, if the reinforcement learning agent (e.g., the reinforcement learning agent 350) is designed to accept the target specifications for an inductor as input, the reinforcement learning agent 350 may initially learn a policy using rewards computed based on performance of initially generated inductor designs relative to specifications sampled from initial distributions. The initial distributions may be defined based on a set of initial reference specifications, as described above.

At 604, a set of target specifications and design constraints are received for an inductor. The target specifications for an inductor represent performance goals that the generated inductor design should meet or exceed. The target specifications for an inductor may include a target inductance, a target resistance and a target SRF, for example. The design constraints are constraints that should not be violated by the inductor design. In some examples, the design constraints may include physical constraints based on the physical design of the VCO circuit. For example, the design constraints for an inductor may include a maximum available area (e.g., maximum available area for the inductor within the VCO circuit), a location of an input pin and a location of an output pin.

At 606, an inductor design is generated segment-by-segment, where a reinforcement learning agent is used to generate segment parameters for each segment that is added to the inductor design. Step 606 may be performed using the inductor drawing module 212 and the optimizer module 214 (which may be implemented using the reinforcement learning agent 300, 350), for example. As described above, the reinforcement learning agent learns a policy using a reinforcement learning algorithm and a reward that is computed based on the performance of generated inductor designs, relative to the target specifications (received at step 604). If the reinforcement learning agent 350 has initially learned a policy (at step 602), step 606 may involve further learning the policy so that the generated inductor design is optimized for the target specifications.

To generate a new inductor design, an initialization step (not shown in FIG. 6) may be first performed. For example, the inductor drawing module 212 may initialize a new drawing canvas, based on the received design constraints for the inductor (e.g., based on the maximum available area, and location of input and output pins). The inductor design may then be generated segment-by-segment, starting from the location of the input pin. The inductor design may be generated segment-by-segment using steps 608, optionally 610, 612 and 614.

At 608, the current inductor state is inputted to the reinforcement learning agent 300, 350. If the inductor design was newly initialized, the current inductor state may be a blank canvas. Otherwise, the current inductor state includes any and all existing segments in the inductor designs (i.e., the sequence of all segments that have been drawn so far). The current inductor state may be formatted into a format that can be processed by the reinforcement learning agent 300, 350, such as a 2D Boolean image.

The reinforcement learning agent 300, 350 implements a learned policy to map the current inductor state to segment parameters for a new segment of the inductor. For example, the inductor state may be encoded into a feature representation (e.g., using an image encoder 310 and one or more hidden layers 320), which may be processed by a Q network 330 (which is used by the reinforcement learning agent 300, 350 to implement the policy), to output segment parameters for a new segment of the inductor.

Optionally, at 610, if the reinforcement learning agent (e.g., the reinforcement learning agent 350) is designed to accept target specifications for the inductor as input, the target specifications for the inductor (which were received at step 604) may also be inputted to the reinforcement learning agent 350. The target specifications for the inductor may be normalized (e.g., by a normalization layer 340 of the reinforcement learning agent 350) and combined (e.g., concatenated) with the feature representation, and processed by the Q network 330 to output segment parameters for a new segment of the inductor.

At 612, the segment parameters for a new segment to be added to the inductor design are obtained from the reinforcement learning agent 300, 350. The segment parameters for a new segment may include, for example, segment length, segment angle (relative to the previously added segment; or relative to the canvas coordinate system) and segment width. In some examples, the segment parameters may also include the metal layer for the new segment.

At 614, the new segment is added to the inductor design, in accordance with the segment parameters obtained at step 612. As previously described, the new segment may be added to the end of the previously added segment (or may be added to the location of the input pin if the new segment is the first segment of the inductor design to be drawn).

If addition of the new segment to the inductor design results in a violation condition being met (e.g., the added new segment overlaps or crosses another existing segment, or the new segment extends outside of the maximum available area), then generation of the inductor design may be aborted. A small penalty may be fed back to the reinforcement learning agent 300, 350 to enable the reinforcement learning agent 300, 350 to learn from the violation. The inductor drawing module 212 may reinitialize the drawing canvas and step 606 may be performed again from the start, to attempt to generate another inductor design.

If no violation condition is met, steps 608, optionally 610, 612 and 614 may be performed iteratively until a termination condition is met (e.g., a segment added to the inductor design reaches the location of the output pin, or a segment added to the inductor design reaches the line of symmetry midpoint between the locations of the input and output pins). If the termination condition is met, the method 600 may proceed to step 616.

In some examples, if the termination condition is that the line of symmetry has been reached, the inductor design may be completed by mirroring the segments across the vertical line of symmetry (i.e., a line of symmetry extending perpendicularly from the edge of the area, midway between the locations of the input and output pins).

At 616, simulation results are obtained for the generated inductor design. The simulation results represent the simulated performance of the generated inductor design. For example, a determination may be made whether the generated inductor design is identical to an inductor design that is already stored in the cache 230. This may be done by comparing an index (e.g., a hash key generated from the list of points representing the inductor design) of the generated inductor design with indices of stored inductor designs in the cache 230. If there is a match, then the stored inductor design having the same index is identified and the stored simulation results associated with the identified stored inductor design is retrieved from the cache 230.

If there is no match, this means that the generated inductor design is not identical to any stored inductor design in the cache 230. The generated inductor design may be stored in the cache 230 together with its index. The generated inductor design (e.g., in a .spi file format, or other format that can be used for performing a simulation) may also be sent to the simulator module 220, and the simulation results generated by the simulator module 220 may be returned to the cache 230 and stored in association with the generated inductor design.

At 618, a reward is computed for the reinforcement learning agent 300, 350, using the simulation results. For example, the reward may be computed using loss components (e.g., inductance loss, resistance loss, SRF loss and optionally area loss), as described above. The computed reward is fed back to the reinforcement learning agent 300, 350, to enable the reinforcement learning agent 300, 350 to learn the parameters of the implemented policy. For example, the reinforcement learning agent 300, 350 may use any suitable reinforcement learning algorithm to update the parameters (e.g., weight values) of the Q network 330 that is used to implement the policy, with the aim of minimizing the loss components (i.e., maximizing the reward).

At 620, if the reward (or other performance evaluation) for the generated inductor design passes a defined performance threshold (e.g., the reward must be higher than a defined threshold), the generated inductor design may be added to a set of candidate inductor designs. Step 620 may be performed only if the generated inductor design is not identical to a previously stored inductor design, to avoid duplication of candidate inductor designs. In some examples, all previously generated inductor designs may be stored in the cache 230 or another storage (e.g., a record of all successfully generated inductor designs, including duplicated inductor designs, may be stored in a file separate from the cache 230).

The method 600 may return to step 606 to generate another inductor design. The steps 606-620 may be repeated until a stop generation condition is met. For example, the stop generation condition may be met when the number of candidate inductor designs (e.g., the number of inductor designs that satisfy the defined performance threshold, which may be stored in the cache 230 or another storage) meets a minimum required number, or when the number of inductor designs stored in the cache 230 meets a maximum number. When the stop generation condition is met, the method 600 proceeds to step 622.

At 622, the set of candidate inductor designs is outputted. For example, if the set of candidate inductor designs is stored in the cache 230, the set of candidate inductor designs may be outputted from the cache 230. In some examples, the candidate inductor designs may be outputted in a ranked order or with a ranking indicating the relative performance of the candidate inductor designs. For example, the candidate inductor designs may be ranked based on the computed reward for each candidate inductor design (e.g., the candidate inductor design having the highest reward may be ranked first) when outputted. The candidate inductor designs may be outputted in any suitable format, such as in Boolean image format, list of points format and/or .spi file format.

The set of candidate inductor designs may be used by a human engineer to select a particular inductor design to implement in a VCO circuit, for example.

In various examples, the present disclosure has described systems and methods that enable automated generation of inductor designs, without starting from a template. An inductor design is generated segment-by-segment, in accordance with design constraints. An optimizer module, which may be implemented using a reinforcement learning agent, generates segment parameters to be added to the inductor design, with the goal of meeting or exceeding target specifications.

The present disclosure describes example architectures for a reinforcement learning agent that may be used to generate the segment parameters. Examples of reward computation have also been described, to enable the reinforcement learning agent to learn a policy to generate segment parameters that optimize the inductor design, based on the target specifications.

The present disclosure also describes an example architecture for a reinforcement learning agent that enables the target specifications to be provided as input to the reinforcement learning agent, and an example method for initially learning the policy implemented by the reinforcement learning agent using an initial distribution defined around initial reference specifications. This may enable the reinforcement learning agent to more quickly adapt to modifications in the target specifications.

Although the present disclosure has described examples in the context of generating inductor designs for VCO circuits, it should be understood that the present disclosure may be suitable for other applications. For example, the present disclosure may also be used for generating inductor designs for any on-chip inductors, with VCO inductors being a type of on-chip inductor. Further, the present disclosure may be used for generation of more complex inductor designs. For example, the present disclosure may be used for generating switchable inductor designs having multiple distinct coils, by generating each coil using the segment-by-segment process described herein.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processor device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for generating a candidate inductor design comprising:
   receiving target specifications for an inductor;
   generating an inductor design segment-by-segment using a reinforcement learning agent to generate segment parameters for each added segment, wherein the reinforcement learning agent implements a policy that is learned using a reward computed based on performance of the generated inductor design relative to the target specifications, wherein the inductor design is generated segment-by-segment by:
      inputting to the reinforcement learning agent a current inductor state representing any existing segments of the inductor design;
      obtaining, using the policy implemented by the reinforcement learning agent and based on the inputted current inductor state, segment parameters for a new segment to be added to the inductor design;
      updating the current inductor state to connect the new segment to any existing segments in the inductor design, in accordance with the segment parameters obtained from the reinforcement learning agent; and
      repeating the inputting, obtaining and updating until a termination condition is met; and
   outputting the generated inductor design as the candidate inductor design after determining that the generated inductor design satisfies a predefined performance threshold.

2. The method of claim 1, wherein the target specifications are included in the input to the reinforcement learning agent.

3. The method of claim 2, wherein the policy implemented by the reinforcement learning agent is initially learned using rewards computed based on performance of initially generated inductor designs relative to specifications sampled from initial distributions based on a set of initial reference specifications, and wherein the policy implemented by the reinforcement learning agent is further learned using the reward computed based on performance of the generated inductor design relative to the target specifications.

4. The method of claim 1, wherein the policy implemented by the reinforcement learning agent is learned by:
   after the termination condition is met by the generated inductor design, obtaining simulation results representing the performance of the generated inductor design;
   computing the reward by computing one or more loss components between the simulation results and the target specifications; and
   updating parameters of a neural network used by the reinforcement learning agent to implement the policy based on the computed reward.

5. The method of claim 4, wherein obtaining the simulation results comprises:
   determining that the generated inductor design is identical to a stored inductor design; and
   retrieving the simulation results stored in association with the stored inductor design.

6. The method of claim 5, wherein determining that the generated inductor design is identical to the stored inductor design comprises:
   matching a hash key of the generated inductor design with a hash key of the stored inductor design.

7. The method of claim 4, wherein determining that the generated inductor design satisfies a predefined performance threshold comprises determining that the computed reward satisfies the predefined performance threshold.

8. The method of claim 1, wherein outputting the generated inductor design as the candidate inductor design comprises:
   adding the generated inductor design to a set of candidate inductor designs after determining that the generated inductor design satisfies a predefined performance threshold; and
   outputting the set of candidate inductor designs after a minimum number of candidate inductor designs is satisfied.

9. The method of claim 1, wherein design constraints for the inductor are received, and wherein generating the inductor design comprises first initiating a blank design in accordance with the design constraints.

10. The method of claim 9, wherein the reward is also computed based on the generated inductor design relative to the design constraints.

11. A computing system comprising:
   a memory storing instructions; and
   one or more processing units coupled to the memory;
   wherein the processing unit is configured for execution of the instructions to cause the computing system to:
      receive target specifications for an inductor;

generate an inductor design segment-by-segment using a reinforcement learning agent to generate segment parameters for each added segment, wherein the reinforcement learning agent implements a policy that is learned using a reward computed based on performance of the generated inductor design relative to the target specifications, wherein the inductor design is generated segment-by-segment by:
    inputting to the reinforcement learning agent a current inductor state representing any existing segments of the inductor design;
    obtaining, using the policy implemented by the reinforcement learning agent and based on the inputted current inductor state, segment parameters for a new segment to be added to the inductor design;
    updating the current inductor state to connect the new segment to any existing segments in the inductor design, in accordance with the segment parameters obtained from the reinforcement learning agent; and
    repeating the inputting, obtaining and updating until a termination condition is met; and
output the generated inductor design as the candidate inductor design after determining that the generated inductor design satisfies a predefined performance threshold.

12. The computing system of claim 2, wherein the target specifications are included in the input to the reinforcement learning agent, wherein the policy implemented by the reinforcement learning agent is initially learned using rewards computed based on performance of initially generated inductor designs relative to specifications sampled from initial distributions based on a set of initial reference specifications, and wherein the policy implemented by the reinforcement learning agent is further learned using the reward computed based on performance of the generated inductor design relative to the target specifications.

13. The computing system of claim 11, wherein the policy implemented by the reinforcement learning agent is learned by:
    after the termination condition is met by the generated inductor design, obtaining simulation results representing the performance of the generated inductor design;
    computing the reward by computing one or more loss components between the simulation results and the target specifications; and
    updating parameters of a neural network used by the reinforcement learning agent to implement the policy based on the computed reward.

14. The computing system of claim 13, wherein the processing unit is further configured for execution of the instructions to cause the computing system to determine that the generated inductor design satisfies a predefined performance threshold by determining that the computed reward satisfies the predefined performance threshold.

15. The computing system of claim 11, wherein the processing unit is further configured for execution of the instructions to cause the computing system to output the generated inductor design as the candidate inductor design by:
    adding the generated inductor design to a set of candidate inductor designs after determining that the generated inductor design satisfies a predefined performance threshold; and
    outputting the set of candidate inductor designs after a minimum number of candidate inductor designs is satisfied.

16. The computing system of claim 11, wherein design constraints for the inductor are received, and wherein the processing unit is further configured for execution of the instructions to cause the computing system to generate the inductor design by first initiating a blank design in accordance with the design constraints.

17. The computing system of claim 16, wherein the reward is also computed based on the generated inductor design relative to the design constraints.

18. A non-transitory computer readable medium having instructions encoded thereon, wherein the instructions, when executed by a processing unit of a computing system, cause the computing system to:
    receive target specifications for an inductor;
    generate an inductor design segment-by-segment using a reinforcement learning agent to generate segment parameters for each added segment, wherein the reinforcement learning agent implements a policy that is learned using a reward computed based on performance of the generated inductor design relative to the target specifications, wherein the inductor design is generated segment-by-segment by:
        inputting to the reinforcement learning agent a current inductor state representing any existing segments of the inductor design;
        obtaining, using the policy implemented by the reinforcement learning agent and based on the inputted current inductor state, segment parameters for a new segment to be added to the inductor design;
        updating the current inductor state to connect the new segment to any existing segments in the inductor design, in accordance with the segment parameters obtained from the reinforcement learning agent; and
        repeating the inputting, obtaining and updating until a termination condition is met; and
    output the generated inductor design as the candidate inductor design after determining that the generated inductor design satisfies a predefined performance threshold.

19. The method of claim 1, wherein the termination condition is met when the inductor design is connected by segments between a defined input pin and an output pin or a line or symmetry.

20. The computing system of claim 13, wherein the processing unit is further configured for execution of the instructions to cause the computing system to obtain the simulation results by:
    determining that the generated inductor design is identical to a stored inductor design; and
    retrieving the simulation results stored in association with the stored inductor design.

* * * * *